(12) United States Patent
Daoud et al.

(10) Patent No.: US 6,801,704 B1
(45) Date of Patent: Oct. 5, 2004

(54) FIBER OPTICS SPLICE HOLDER

(75) Inventors: Bassel H. Daoud, Parsippany, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/449,387

(22) Filed: May 30, 2003

(51) Int. Cl.[7] ................................. G02B 6/00
(52) U.S. Cl. ..................... 385/136; 385/95; 385/99; 385/134; 385/135; 385/137
(58) Field of Search ................. 385/134, 135, 385/136, 137, 138, 95, 99

(56) References Cited

U.S. PATENT DOCUMENTS

| | | | | |
|---|---|---|---|---|
| 5,530,786 A | * | 6/1996 | Radliff et al. | 385/136 |
| 5,566,268 A | * | 10/1996 | Radliff et al. | 385/137 |
| 5,566,269 A | * | 10/1996 | Eberle et al. | 385/137 |
| 5,717,812 A | * | 2/1998 | vandenEnden et al. | 385/135 |
| 6,259,851 B1 | * | 7/2001 | Daoud | 385/135 |
| 6,360,051 B1 | * | 3/2002 | Daoud | 385/137 |
| 6,370,309 B1 | * | 4/2002 | Daoud | 385/135 |

* cited by examiner

*Primary Examiner*—Brian M. Healy

(57) ABSTRACT

An optical fiber spice holder, including a base having an upper surface and a plurality of sidewalls coupled substantially orthogonal to the upper surface. Each pair of sidewalls of the plurality of sidewalls forms at least one channel therebetween. The at least one channel has a first radius sized to secure an optical fiber splice, and a plurality of channels are formed adjacent to each other.

22 Claims, 4 Drawing Sheets

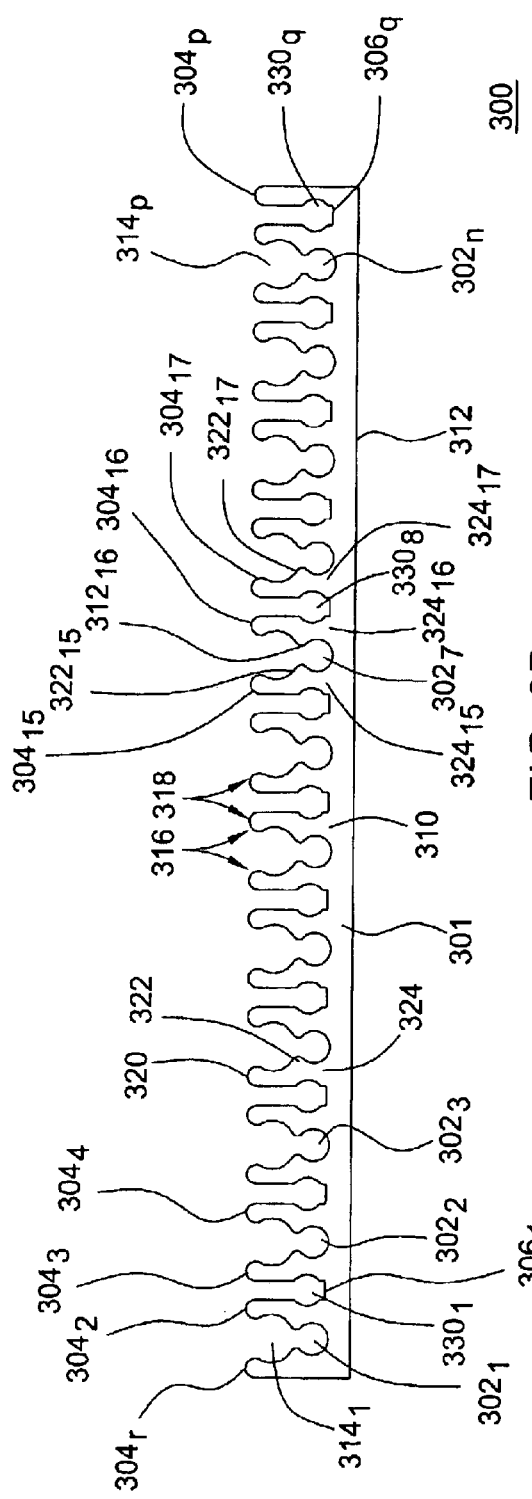
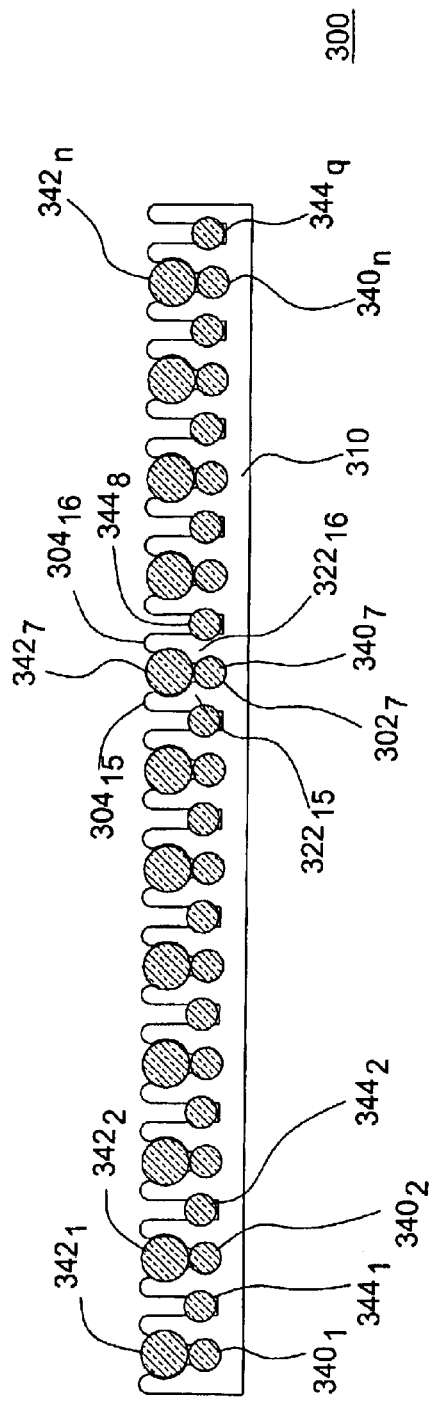
FIG. 3B
FIG. 3C

FIBER OPTICS SPLICE HOLDER

BACKGROUND OF THE INVENTION

1. Field of the Invention

The present invention generally relates to fiber optics splice holders, and more particularly, to a fiber optic splice holder having improved versatility and density for retaining fiber optic splices.

2. Description of the Related Art

Presently, there are three different types of optical splices that are most widely used. Different splice holders have been designed and implemented for the different types of splices. For example, mechanical splice holders have been used for mechanical splices, array (i.e., ribbon) splice holders are used for ribbon splices, and single fusion splice holders are used for single fusion splices. Each of these splice holders is different In shape and size in order to retain the different types of optical fiber splices. For example, optical fiber strands in a fiber ribbon cable are larger than single stranded optical fibers. Current single fusion splice holders cannot be used to obtain array splices, since the array splices are larger than the fusion splices, and therefore would not fit within the fusion splice holder. Conversely, fusion splices cannot be retained in an array splice holder, since ribbon cable splices have a larger diameter than the fusion splices.

As bandwidth requirements of an enterprise increase, the need to provide additional fiber optic cabling increases as well. Accordingly, there is a need to improve the organization of fiber optic routing in a fiber optical closure, which routes various fiber optic cabling to different connectors. Current splice holders do not avail themselves well to the increasing density of optical fibers, and further require a large footprint of real estate in such fiber optical closures to hold the aforementioned types of splices. Therefore, there is a need in the art for an improved optical splice holder.

SUMMARY OF THE INVENTION

These and other deficiencies of the prior art are addressed by the present invention of a fiber optic splice holder. In one embodiment, an optical fiber spice holder, including a base having an upper surface and a plurality of sidewalls coupled substantially orthogonal to the upper surface. Each pair of sidewalls of the plurality of sidewalls forms at least one channel therebetween. The at least one channel has a first radius sized to secure an optical fiber splice, and a plurality of channels are formed adjacent to each other.

In a second embodiment, the optical fiber spice holder includes a base having an upper surface and a plurality of sidewalls coupled substantially orthogonal to the upper surface. A plurality of first pairs of sidewalls of the plurality of sidewalls form a first channel and a second channel therebetween, where the first and second channels respectively have a first radius and a second radius sized to secure a first and second portion of a plurality of optical fiber splices. In a third embodiment, a plurality of third channels is respectively interleaved between each pair of the plurality of first pairs of sidewalls.

BRIEF DESCRIPTION OF THE DRAWINGS

So that the manner in which the above recited features of the present invention are attained and can be understood in detail, a more particular description of the invention, briefly summarized above, may be had by reference to the embodiments thereof, which are illustrated in the appended drawings.

It is to be noted, however, that the appended drawings illustrate only typical embodiments of this invention and are therefore not to be considered limiting of its scope, for the invention may admit to other equally effective embodiments.

FIGS. 3A, 3B, and 3C respectively depict isometric and side views of a third embodiment of a splice holder of the present invention.

To facilitate understanding, identical reference numerals have been used, where possible, to designate identical elements that are common to the figures.

DETAILED DESCRIPTION OF THE INVENTION

Figure 1A:
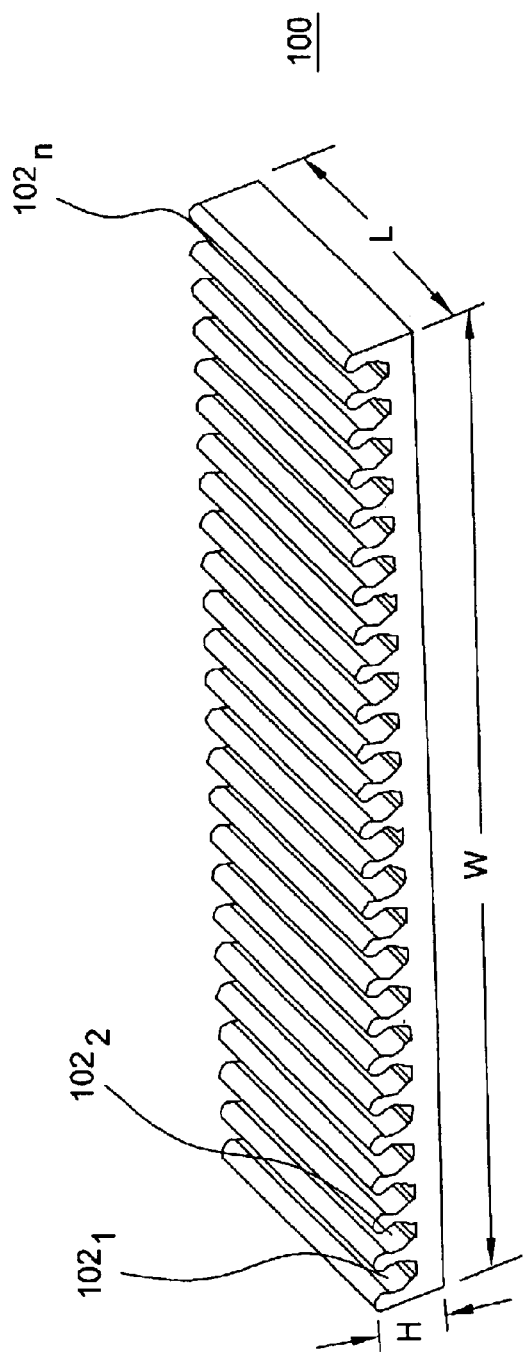
FIGS. 1A and 1B respectively depict isometric and side views of a first embodiment of a splice holder of the present invention.
Figure 1B:
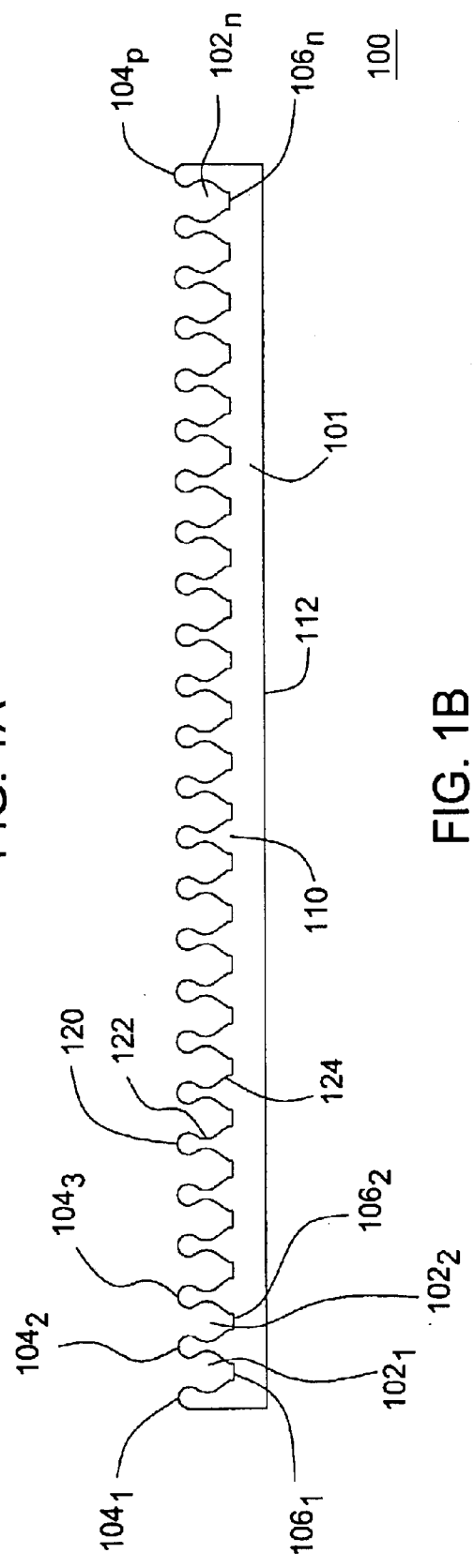

The present invention is a fiber optic splice holder suitable for use in an optical fiber closure for facilitating improved organization features, as well as routing of the optical fiber cabling. For a detailed understanding of the closure and illustrative placement of the splice holder of the present invention within the closure, the reader is directed to U.S. patent application Ser. No. 10/183,273, filed Jun. 27, 2002, and Ser. No. 10/372,742, filed Feb. 24, 2003, which are incorporated by reference herein, in their entireties. In the following description, numerous specific details are set forth to provide a more thorough understanding of the invention. As will be apparent to those skilled in the art, however, various changes using different configurations may be made without department from the scope of the invention. In other instances, well-known features have not been described in order to avoid obscuring the invention. Thus, the invention is not considered limited to the particular illustrative embodiments shown in the specification, and all such alternate embodiments are intended to be included in the scope FIGS. 1A and 1B respectively depict isometric and side views of a first embodiment of a fiber optic splice holder 100 of the present invention. In particular, the splice holder 100 comprises a base 101 having an upper surface 110, and a lower surface 112, and a plurality of sidewalls $104_1$ through $104_p$ (collectively, sidewalls 104) disposed substantially orthogonal to the upper surface 110 of the splice holder 100. Each pair of adjacent sidewalls (e.g., sidewalls $104_1$ and sidewalls $104_2$) forms a channel 102, therebetween. For example, as shown in FIG. 1B, sidewalls $104_1$ through $104_p$ illustratively form channels $102_1$ through $102_n$ (collectively channels 102). Each of the channels 102 has a radius that is sized to receive and secure an optical fiber splice illustratively from either an optical fiber ribbon cable or a single stranded fiber. In the exemplary-embodiment shown in FIGS. 1A and 1B, the radius of the adjacent channels 102 is the same for each of the channels 102. One skilled in the art will appreciate that adjacent channels 102 may be of various sizes (i.e., radius) to respectively accommodate various sized optical fiber splices.

The exemplary splice holder 100 is fabricated from a flexible material, such as silicone rubber, neoprene rubber, plastic and polypropylene, among other flexible-type materials. In particular, the sidewalls 104 need to be flexible to minimally displace from the original orthogonal position, in order to receive the optical fiber splices when being inserted into the channels 102. The sidewalls then confirm around the optical fiber splices to securely retain the splices within the channel 102.

Typically, the optical fiber splice holder 100 is utilized in an optical fiber closure or cabinet, which is used for routing and connecting the optical fiber ribbons and strands to external connectors. For example, the optical fiber closure may be utilized in a utility closure of an enterprise for routing an optical fiber trunk to various network connections throughout a building. For a detailed understanding of an optical fiber closure, the reader is directed to U.S. patent application Ser. No. 10/448,792, pending, filed simultaneously herewith (Attorney Docket DAOUD 298), which is incorporated by reference herein in its entirety. In one embodiment of the present invention, the optical fiber splice holder 100 includes an adhesive provided on the lower surface 112 of the splice holder 100 to secure the splice holder, illustratively, to a tray or bottom surface in the optical fiber closure. One skilled in the art will appreciate that the optical fiber splice holder 100 may be fastened to a surface by any other conventional manner, such as by screws, bolts, latches, or any other type of fastener.

Each of the sidewalls 104 comprises an upper portion 120, a middle portion 122 and a lower portion 124. Since each channel is substantially circular in shape, the upper portion 120 and lower portion 124 have a greater width than the middle portion 122 of each sidewall 104. Thus, each pair of sidewalls (e.g., sidewalls $104_1$ and $104_2$) circumscribes an optical fiber splice along each side and bottom of the optical splice, as well as over a portion of the top of the optical fiber splice.

The splice holder 100 is sized to accommodate the different types of optical fibers used in the industry. Thus, the length, width and height of the splice holder 100 depend on which type of optical fibers are retained by the splice holder 100. For example, optical fibers in a ribbon cable typically have a diameter of 0.2 inches, while single stranded optical fibers typically have a diameter of 0.12 inches. Moreover, a typical fiber optic splice has a length of approximately 2 inches.

In particular, a conventional optical splice comprises heat shrink tubing with a steel pin inserted therein. The ends of two fiber strands are inserted into opposing ends of the shrink tubing such that the ends contact one another, and the heat shrink tubing is then melted to conform around the steel pin and outer surface of the inserted ends of the optical fiber strands, thereby securely splicing the two fiber strands together. The steel pin serves as a support to minimize bending at the splice.

In one embodiment, the splice holder 100 has a length of approximately 1 inch, such that the individual splices when inserted in the channels 102 extend approximately one-half an inch (½) on each side of the splice holder 100. One skilled in the art will appreciate that the length of the splice holder may vary according to the design needs of the users. For example, where the splice holder 100 has a length of approximately 2 inches, such that there is no overlap of the splice when inserted in the splice holder 100, a notch 106 may optionally be formed in the upper surface 110 at the bottom portion of each channel 102. The notch 106 may be utilized to insert some type of tool (e.g., a screwdriver) between the bottom of a splice and the upper surface 110 of the splice holder 100 to pry or lift the splice up and out of the channel 102, illustratively, for maintenance or rerouting purposes. The notch 106 may be formed at the ends of each channel 102, or the notch 106 may form a notch channel that runs the entire length of each channel 102, as shown in FIGS. 1A and 1B.

The width of the splice holder 100 is dependent on the number of channels 102 required, as well as the type of optical fibers that are being spliced and inserted into the splice holder 100. For example, a splice holder 100 having twenty-four (24) channels 102 that is used to receive splices for ribbon fibers will be slightly larger than a fiber splice holder having the same number of channels for individual stranded splices. The number of channels may vary according to design constraints, and in one embodiment, the number of channels may range between 6 and 48 channels on a single splice holder 100.

The overall height of the splice holder 100 is also dependent on the type of splices being retained in the splice holder 100. In one embodiment, the height of the base 101 is in a range between 0.08" and 0.2", and preferably 0.12". Furthermore, the height of the individual sidewalls 104 is in a range of 0.3" and 0.45", and preferably 0.35" for the ribbon spliced fibers, and in a range of 0.2" and 0.3", and preferably 0.25" for the individual stranded fiber splices. Moreover, the thickness or width of each sidewall 104 is dependent on the type of material used and the flexibility desired. In one embodiment where the splice holder 102 is fabricated from silicone rubber, the upper and lower potions 120 and 124 have a width in a range of between 0.07" and 0.09".

Figure 2A:
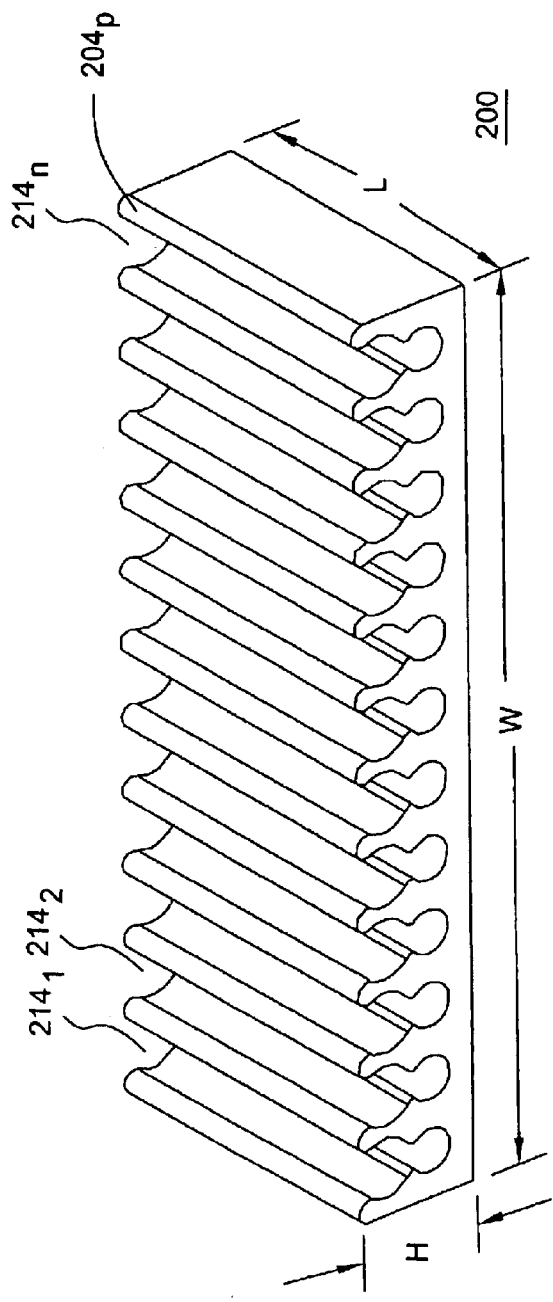
FIGS. 2A and 2B respectively depict isometric and side views of a second embodiment of a splice holder of the present invention.
Figure 2B:
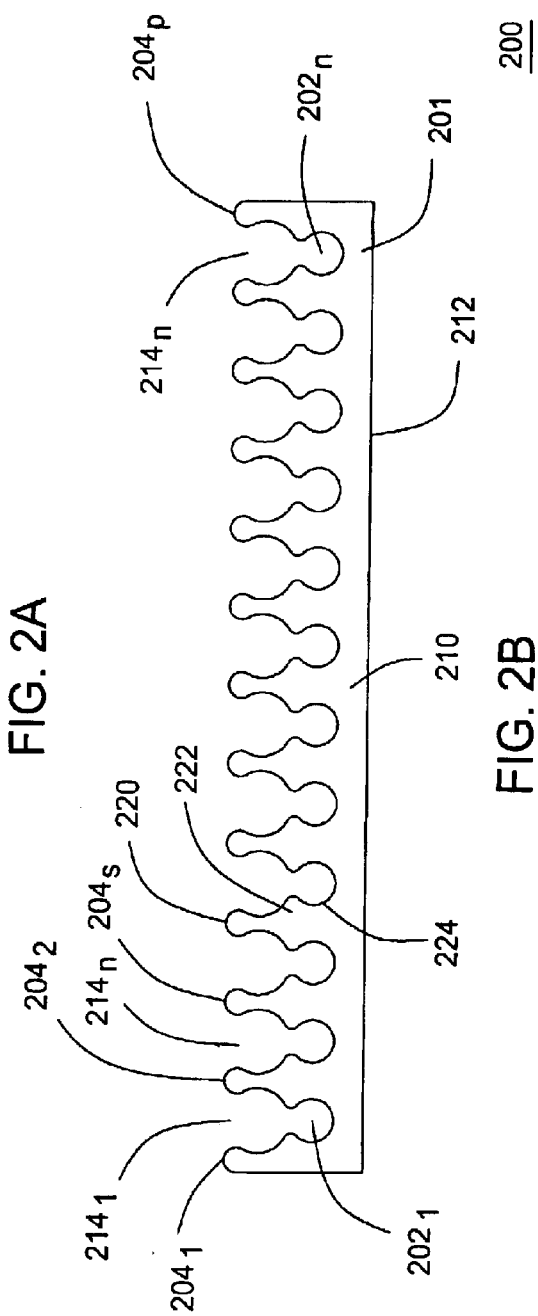

FIGS. 2A and 2B depict a second embodiment of the splice holder of the present invention. In particular, the second embodiment as shown in FIGS. 2A and 2B is similar to the first embodiment shown in FIGS. 1A and 1B, except that the second embodiment accommodates a second channel 214 disposed (stacked) over the first channel 202. For example, exemplary splice holder 200 in FIGS. 2A and 2B illustratively comprise twelve (12) first channels $202_1$ through $202_n$ (collectively first channels 202) and twelve (12) second channels $214_1$ through $214_n$ (collectively second channels 214) formed above the first plurality of channels 202. One skilled in the art will appreciate that the number of first and second channels 202 and 214 are shown for illustrative purposes only, and should not be considered as being limiting.

As discussed above regarding the pair of sidewalls respectively shown in FIGS. 1A and 1B, a pair of sidewalls (e.g., sidewalls $204_1$ and $204_2$), form a first channel $202_1$ and a second channel $214_1$. In particular, the first channel 202 has a first radius, which is defined by a lower portion 224 of each pair of sidewalls 204 and the upper surface 210 of the base 201 of the splice holder 200. A middle portion 222 of each pair of sidewalls 204 extends inwardly toward each other, and together form an upper surface area of the first channel 202, as well as a bottom surface area of the second channel 214. Moreover, a top portion 220 of each pair of sidewalls 204 forms a side and an upper portion of the second channel 214.

In one embodiment the second channel 214 has a radius that is greater than the radius of the first channel 202. As such, the first channel 202 may be used to secure a splice for an optical fiber strand illustratively having a diameter of 0.12", while the second channel 214 has a radius size to accommodate a splice having a diameter of 0.2", such as those of a ribbon splice. Although the second embodiment as shown and discussed with respect to FIGS. 2A and 2B provides two channels 202 and 214 formed by each pair of sidewalls (e.g., the sidewalls $204_1$ and $204_2$), a person skilled in the art will appreciate that the larger channel (i.e., the second channel 214) may be formed on the upper surface 210 of the splice holder 200 and the smaller channel (i.e., the first channel 202) may be formed above the second channel 214. Alternatively, the sizes of both channels may also be the same.

As discussed with the first embodiment of FIGS. 1A and 1B, the second embodiment is also fabricated from a flexible material such as rubber, plastic, polypropylene, or any other flexible material, and may have an adhesive or other type of fastener disposed on the lower surface 201 or on the sides of the base 201 of the splice holder 200 in order to secure the splice holder 200 to an external surface area. Moreover, the length and width of a splice holder 200 are dependent upon the number of channel pairs formed in a splice holder 200. Furthermore, the overall height of the splice holder 200 is equal to the height of the base 201 plus approximately the combined diameters of the splice pairs that are to be received in the first and second channels 202 and 214 between each of the sidewall pairs. As discussed above, with respect to FIGS. 1A and 1B, the base 201 has a height in a range of approximately 0.12", the individual stranded optical fibers have a diameter of approximately 0.12" and the ribbon cable optical fiber strands have diameters of approximately 0.2". Therefore the overall height of the splice holder of the second embodiment is approximately in the range of 0.40" and 0.5".

Figure 3A:
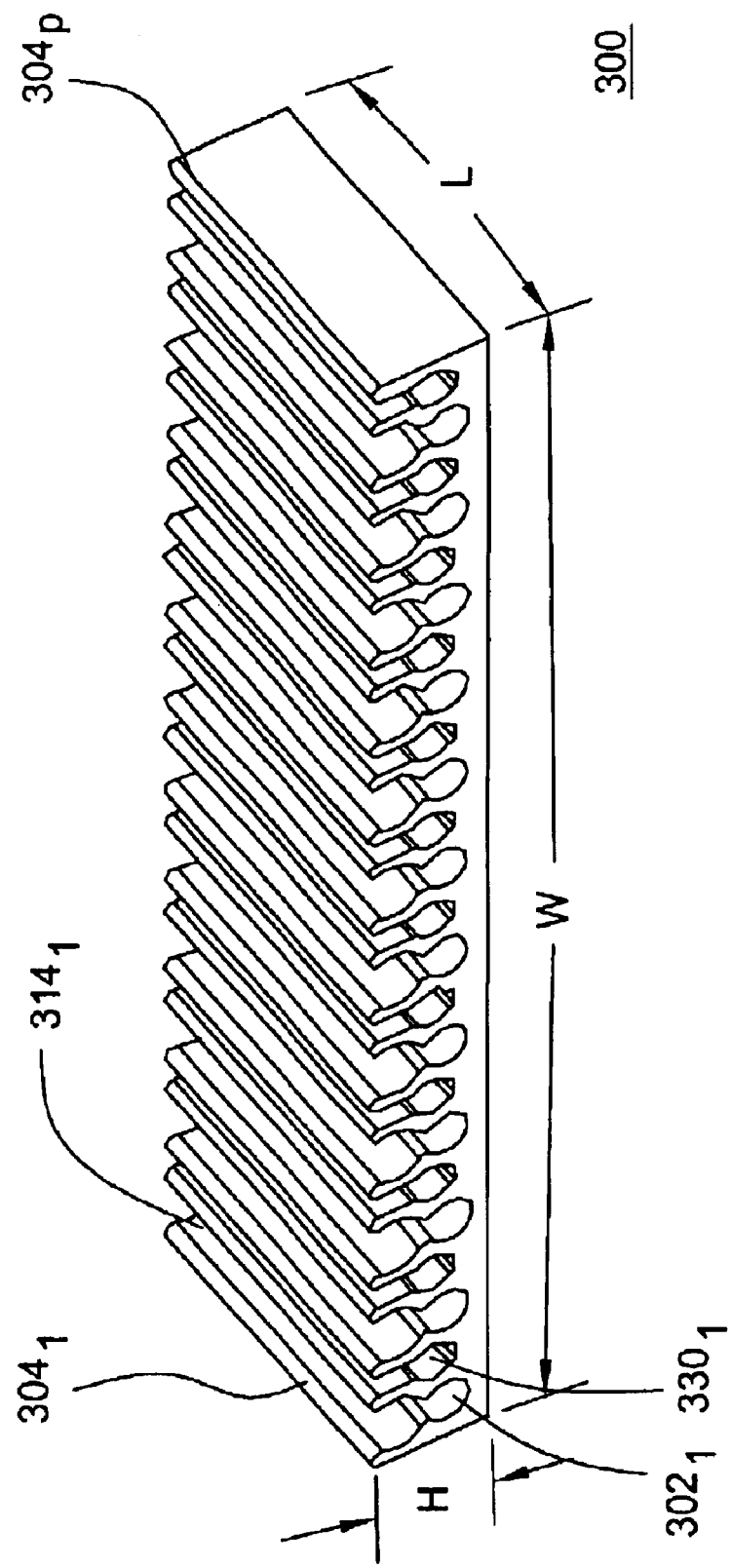

FIGS. 3A and 3B, and 3C depict an isometric and sideviews of a third embodiment of the splice holder 300 of the present invention. In particular, this third embodiment represents a combination of the first embodiment and second embodiment as respectively shown in FIGS. 1A–1B and 2A–2B.

The third embodiment respectively shown in FIGS. 3A, 3B, and 3C comprises a base 301 having an upper surface 310, a lower surface 312, and a plurality of sidewalls $304_1$ through $304_p$ (collectively sidewalls 304) coupled substantially orthogonal to the upper surface 310. As discussed above with regard to the first and second embodiments, the splice holder 300 is fabricated from a flexible material such as a plastic, rubber, polypropylene, among other flexible materials, and may have an adhesive or other type of fastener provided on the lower surface 312 of the splice holder to attach the splice holder 300 to an external surface.

Each of the plurality of sidewalls 304 serves a dual purpose of forming a sidewall for the stacked channels 302 and 314 as discussed with regard to the second embodiment of FIGS. 2A and 2B, as well as forming a sidewall for a third channel 302, as discussed with respect to the first embodiment of FIGS. 1A and 1B. That is, each of the plurality of sidewalls 304 has a first side 316 and a second side 318, which illustratively and respectively form the first and second stack channels 302 and 304, as well as a third channel 330. More specifically, a pair of first sides 316 facing each other form the first and second stack channels 302 and 314, while a pair of second sides 318 of the sidewalls 304 facing each other form the third channel 330.

Each of the sidewalls 304 comprises an upper portion 320, middle portion 322, and lower portion 324. The lower portion 324 and middle portion 322 on the first side 316 of each sidewall forms the first channel 302, wherein the middle portion 322 extends a distance to an opposing middle portion 322 of its respective paired sidewall. For example, middle portion $322_{15}$ of sidewall $304_{15}$ curves inwardly towards the opposing middle portion $322_{16}$ of sidewall $304_{16}$ thereby forming an upper surface area of the first channel $302_7$. As shown in FIG. 3C, the first optical fiber splice $340_7$ is seated and secured in the respective first channel $302_7$, such that the base 301, lower and middle portions $324_{15}$ and $322_{15}$ of the sidewall $304_{15}$, and the lower and middle portions $324_{15}$ and $322_{16}$ of the sidewall $304_{16}$ substantially circumscribe the optical fiber splice $340_7$.

Similarly, the exemplary upper portions $320_{15}$ and $320_{16}$ and middle portions $322_{15}$ and $322_{16}$ of the first sides 316 of the respective sidewalls $304_{15}$ and $304_{16}$ form the second channel $314_7$. As shown in FIG. 3C, an optical fiber splice $342_7$ is retained between the respective upper portions $320_{15}$ and $320_{16}$ and middle portions $322_{15}$ and $322_{16}$ of the first side 316 of each of the respective sidewalls $304_{15}$ and $304_{16}$ (i.e., the second channel $314_7$).

Each third channel 330 is formed between the opposing second sides 318 of a pair of sidewalls 304. For example, referring to FIG. 3B, the exemplary third channel $330_8$ is formed between the lower portions $324_{16}$ and $324_{17}$ and middle portions $322_{16}$ and $322_{17}$ of the second sides 318 of the respective sidewalls $304_{16}$ and $304_{17}$. It is noted that in one embodiment, the second sides 318 between the middle and upper portions 322 and 320 are substantially linear, and extend vertically upward. Referring to FIG. 3C, the exemplary third optical fiber splice $344_8$ illustratively shown disposed in the third channel $330_8$ between the second side of the respective sidewall pair $304_{16}$ and $304_{17}$.

Each of the third channels may also comprise a notch 306 that is either formed at the end of each channel or extends all the way across each channel 330, in a similar manner as described in regards to first embodiment of FIGS. 1A and 1B. As such the exemplary third channel $330_8$ is adjacent to the first and second channels $302_7$ and $314_7$. Furthermore, the first and second channels $302_8$ and $314_8$ are adjacent to the third channel $330_8$. As such, the first and second stacked channels 302 and 314 are interleaved between the third channels 330.

In one embodiment, the first and third channels 302 and 330 have the same diameters and are capable of securely retaining optical fibers such as the individual strands having a diameter of 0.12". Further, the second channels 314 have a diameter (e.g., 0.2") that is greater than the diameters of the first and third channels 302 and 330, which are illustratively capable of retaining optical fiber strand splices from a ribbon cable. One skilled in the art will appreciate that the arrangement as shown in FIGS. 3A through 3C may easily be adapted to facilitate optical fibers having the same diameter or variations thereof. For example, the first channel 302 may be formed having a diameter greater than the second channel 314, while the third channel 330 having the same diameter as the second channel 314, may be formed between the upper and middle portions 320 and 322 of the second side 318 of the pairs of sidewalls 304. Although the exemplary splice holders are illustratively shown and discussed as having two stacked channels, a person skilled in the art will appreciate that additional stacked channels may be provided by extending the height of the individual sidewalls, thereby further increasing the splice density therein.

Thus, various embodiments of an optical fiber splice holder have been shown and discussed herein. All three illustrative embodiments provide for improved retention of the optical fiber strands, as well as greater optical fiber splice density to facilitate the increase bandwidth requirements of the enterprises. Furthermore, the second and third embodiments of FIGS. 2A through 3C offer multiple channel sizes capable of securing various types of optical fiber splices in the splice holder. The sidewalls that form the various channels in the optical fiber splice holder are arranged to accommodate the various types of splices to be secured therein, as well as accommodate increased splice density.

Although various embodiments that incorporate the teachings of the present invention have been shown and described in detail herein, those skilled in the art can rarely devise many other varied embodiments that still incorporate these teachings.

What is claimed is:

1. An optical fiber spice holder, comprising:

a base having an upper surface;

a plurality of sidewalls disposed substantially orthogonal to said upper surface, each pair of sidewalls of said plurality of sidewalls forming at least one channel therebetween, said at least one channel having a first radius sized to secure an optical fiber splice, and wherein a plurality of channels are formed adjacent to each other; and wherein each pair of sidewalls of said plurality of sidewalls further comprises a second channel therebetween, said second channel having a second radius sized to secure a second optical fiber splice, wherein said second channel is formed over said first channel, and said second radius is sized different from said first radius.

2. The splice holder of claim 1 further comprising a notch formed in said base beneath and integral with each said channel.

3. The splice holder of claim 2, wherein each respective notch extends a length of each said channel.

4. The splice holder of claim 1, wherein said splice holder is fabricated from a flexible material.

5. The splice holder of claim 4, wherein said splice holder is fabricated from a group of materials consisting of silicone rubber, neoprene rubber, plastic, and polypropylene.

6. The splice holder of claim 1, wherein said base further comprises a bottom surface having an adhesive thereon.

7. The splice holder of claim 1, wherein said plurality of channels comprises channels in a range between 6 and 48 channels.

8. The splice holder of claim 1, wherein each sidewall formed between each adjacent channel comprises a lower portion, a middle portion, and an upper portion, wherein said lower and upper portions have a width greater than said middle portion.

9. The splice holder of claim 1, wherein said second radius is greater than said first radius.

10. The splice holder of claim 1, wherein each sidewall comprises a lower portion, a middle portion, and an upper portion, said lower and middle portions forming said first channel and said middle and upper portions forming said second channel.

11. An optical fiber spice holder, comprising:

a base having an upper surface;

a plurality of sidewalls coupled substantially orthogonal to said upper surface, whew a plurality of first pairs of sidewalls of said plurality of sidewalls form a first channel and a second channel therebetween, said first and second channels respectively having a first radius and a second radius sized to secure a first and second portion of a plurality of optical fiber splices; and wherein a plurality of third channels are respectively interleaved between each pair of said plurality of first pairs of sidewalls.

12. The splice holder of claim 11, wherein said second channel is formed directly over said first channel.

13. The splice holder of claim 11, wherein said third channel comprises a third radius sized to secure a third portion of said plurality of optical fiber splices.

14. The splice holder of claim 11, wherein opposing sidewalls of each adjacent first pair of sidewalls form said third channel therebetween.

15. The splice holder of claim 13, wherein each sidewall formed between said first and second channels, and said third channel, comprises:

a lower portion, a middle portion, and an upper portion, said lower and middle portions forming a portion of said first channel, and said middle and upper portions forming a portion of said second channel.

16. The splice holder of claim 15, wherein said lower and middle portions further form a portion of said third channel.

17. The splice holder of claim 13, wherein said second radius is greater than said first radius.

18. The splice holder of claim 13, wherein said second radius is greater than said third radius.

19. The splice holder of claim 13, wherein said first radius equals said third radius.

20. The splice holder of claim 11, wherein said splice holder is fabricated from a flexible material.

21. The splice holder of claim 20, wherein said spice holder is fabricated from a group of materials consisting of silicone rubber, neoprene rubber, plastic, and polypropylene.

22. The splice holder of claim 11, wherein said base further comprises a bottom surface having an adhesive thereon.

* * * * *